(No Model.)

J. A. HADLEY.
FASTENING FOR PIPE SECTIONS.

No. 556,627. Patented Mar. 17, 1896.

WITNESSES:
F. L. Ourand
W. L. Coombs

INVENTOR:
Joshua A. Hadley,
by Louis Bagger & Co.
Attorneys.

UNITED STATES PATENT OFFICE.

JOSHUA A. HADLEY, OF BRAZIL, INDIANA, ASSIGNOR OF ONE-HALF TO THOMAS C. SMITH, OF SAME PLACE.

FASTENING FOR PIPE-SECTIONS.

SPECIFICATION forming part of Letters Patent No. 556,627, dated March 17, 1896.

Application filed June 26, 1895. Serial No. 554,123. (No model.)

*To all whom it may concern:*

Be it known that I, JOSHUA A. HADLEY, a citizen of the United States, and a resident of Brazil, in the county of Clay and State of Indiana, have invented certain new and useful Improvements in Fasteners for Pipe-Sections; and I do hereby declare that the following is a full, clear, and exact description of the invention, which will enable others skilled in the art to which it appertains to make and use the same, reference being had to the accompanying drawings, which form a part of this specification.

My invention relates to fasteners for securing together stovepipe sections or joints. As is well known, the ordinary manner of connecting stovepipe-sections by frictional contact only is very objectionable, in that the sections are very liable to become disengaged and fall apart.

The object of my invention is to provide a simple and inexpensive fastener by which stovepipe-sections may be readily and securely connected with each other, so as to prevent accidental disengagement, and which can also be easily disengaged when the sections are to be disconnected and the pipe taken down.

The invention consists, essentially, in a flat metal bar having its ends bent at right angles and near one end crimped or bent to form a shoulder, as will be hereinafter more fully described and claimed.

Figure 1:
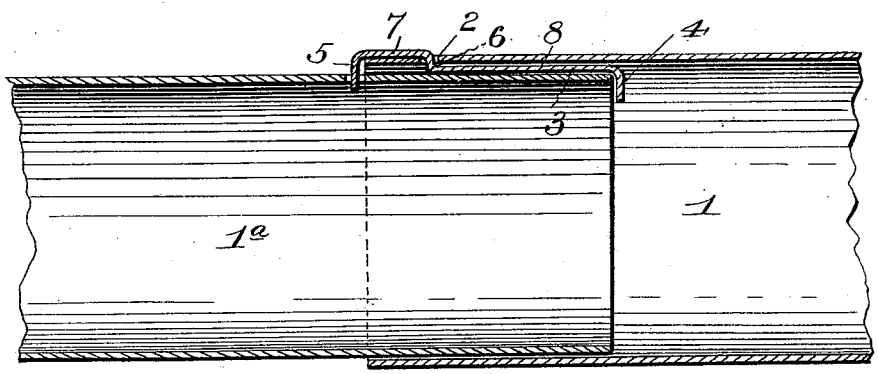
Figure 2:
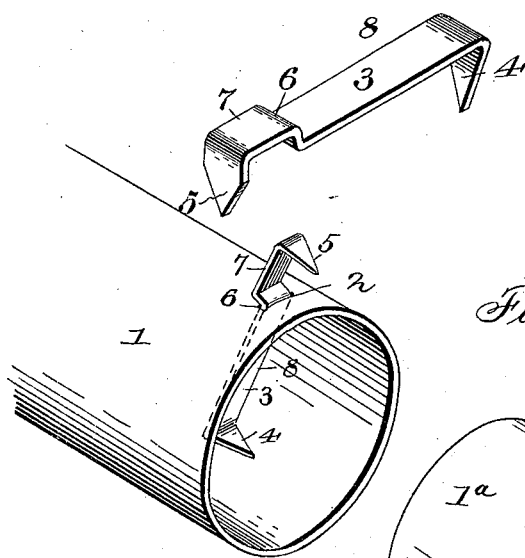
Figure 3:
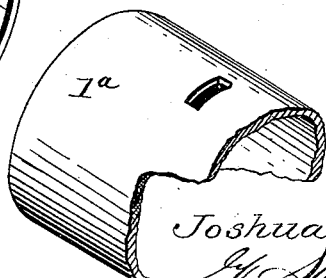

In the accompanying drawings, Figure 1 is a horizontal sectional view of two sections of stovepipe connected together by my improved fastener. Fig. 2 is a perspective view of the fastener detached. Fig. 3 is a perspective view showing two sections of stovepipe in the act of being inserted or connected together.

In the said drawings, the reference-numerals 1 and 1ª designate two stovepipe sections or joints having a rectangular aperture 2 near one end.

The numeral 3 designates the fastener, consisting of a rectangular metal bar having the ends pointed and bent at right angles, forming pointed lugs 4 and 5. Near one end the bar is bent, forming a shoulder 6. It will thus be seen that the fastener consists of the bar having a short and a long arm 7 and 8, a shoulder 6, and the pointed ends 4 and 5.

The manner of using the device is as follows: The long arm thereof is passed through the aperture in one of the stovepipe-sections, with the shoulder 6 engaging with the edges thereof. The other section, 1ª, to be engaged with said section 1 is then inserted therein, as usual, and pushed in until its end comes in contact with the lug 4, by which its movement will be limited. The other lug, 5, will by this operation be forced against the section 1ª, when a sharp blow by a hammer or other instrument will cause it to pierce or puncture the said section and thus securely hold the sections together. By disengaging the said lug from the hole made by forcing it through the metal of the section, which can be easily done by prying it out with any suitable instrument, the two sections can be disconnected.

Having thus fully described my invention, what I claim is—

The combination with the pipe-section 1, having a rectangular aperture near one end, and the section 1ª telescoping into said section 1, of the fastener comprising a metal bar having a double right-angular bend between the ends forming an abrupt shoulder 6, and a long arm 8, and a short arm 7, lying in different planes, and the ends of said arms pointed and bent at right angles thereto, substantially as described.

In testimony that I claim the foregoing as my own I have hereunto affixed my signature in presence of two witnesses.

JOSHUA A. HADLEY.

Witnesses:
JNO. M. TURNER,
JAMES L. WILSON.